United States Patent
Obukhov et al.

[11] 3,749,957
[45] July 31, 1973

[54] ROTOR OF A SYNCHRONOUS NON-SALIENT-POLE MACHINE

[76] Inventors: Vitaly Arsenievich Obukhov, Ulitsa Suvarova, 34, kv. 15; Vladimir Petrovich Glazkov, Ulitsa Festivalnaya, 16, kv. 2, both of Lysieva, U.S.S.R.

[22] Filed: Jan. 25, 1971

[21] Appl. No.: 109,571

Related U.S. Application Data

[63] Continuation of Ser. No. 789,489, Jan. 7, 1969, abandoned.

[52] U.S. Cl. .................................. 310/265, 310/187
[51] Int. Cl. ............................................. H02k 1/22
[58] Field of Search .................... 310/187–189, 193, 195, 198, 199, 201, 206, 207, 215, 216, 260, 261, 262, 264, 265, 269, 270, 271

[56] References Cited
UNITED STATES PATENTS

| | | | |
|---|---|---|---|
| 2,712,085 | 6/1955 | Willyoung | 310/262 X |
| 1,361,546 | 12/1920 | Politowski | 310/187 X |
| 3,408,516 | 10/1968 | Kudlacik | 310/265 X |
| 1,581,828 | 4/1926 | Bergman | 310/262 |
| 681,295 | 8/1901 | Blood | 310/265 |

Primary Examiner—J. V. Truhe
Assistant Examiner—B. A. Reynolds
Attorney—Waters, Roditi, Schwartz & Nissen

[57] ABSTRACT

A rotor of a synchronous non-salient-pole machine has field winding coils placed concentrically relative to high teeth into alternate slots of different depth, the coils disposed in relatively deep slots are divided in height into two parts, and the front portions of the lower parts of the coils disposed in deep slots nearer to a high tooth are under the front portions of the coils disposed in slots further away from the high tooth so that the diameter of the rotor shaft is made greater at the place of the shifted portions of the coils.

7 Claims, 6 Drawing Figures

PATENTED JUL 31 1973

3,749,957

ROTOR OF A SYNCHRONOUS NON-SALIENT-POLE MACHINE

This Application is a Continuation of Ser. No. 789,489 filed Jan. 7, 1969 and now abandoned.

The present invention relates to rotors of synchronous non-salient-pole machines, and more particularly to rotors of synchronous non-salient-pole machines with slots of different depth for receiving coils of a field winding.

Widely known are rotors of synchronous non-salient-pole machines having alternate slots of different depth into which the coils of a field winding are placed concentrically relative to the axis of the rotor. The alternation order of the field winding coils in the front or end portion of such rotors is similar to that in the middle portion of the rotor. The disadvantages of such machines are the great dimensions of their rotors for a given output power and inefficient use of the machine volume.

Accordingly, it is an object of the present invention to overcome the disadvantages associated with the foregoing types of devices.

With these and other objects in view, the invention contemplates reducing the magnetic induction at the root of the teeth formed by the dots and in the rotor yoke for obtaining higher output power without any change in overall dimensions of the machine.

This objective is achieved by providing a rotor of synchronous non-salient-pole machine in which the field winding coils are into alternate slots of different depth, and wherein, according to the invention, the coils placed in deep slots are divided in the height into two parts, i.e. upper and lower parts, and the front portions of the lower parts are axially extended with respect to the upper parts and are disposed under the front portions of the coils in in narrow slots which results in an increased rotor shaft diameter at the location of the axial offset of the coils in the deep slots. This increase of rotor shaft diameter at the location of the offset portions of the coils, that is, in the most saturated part of the rotor (at the root of the teeth) yields reduction of magnetic induction in the lower portion of the teeth and in the rotor yoke. As a result, a smaller magnetomotive force is required for passing the magnetic flux through the rotor.

The description of an illustrative embodiment of the present invention will now proceed in a more detailed explanation taken along with the annexed drawings, in which.

Figure 1:
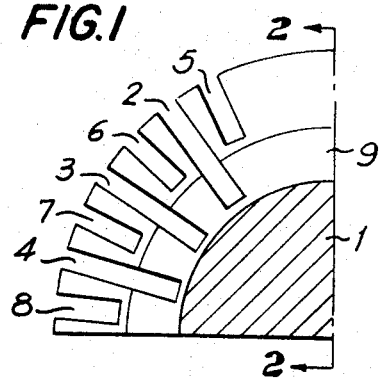
FIG. 1 is a cross-sectional view of a portion of an electric machine rotor with variable depth slots.
Figure 2:
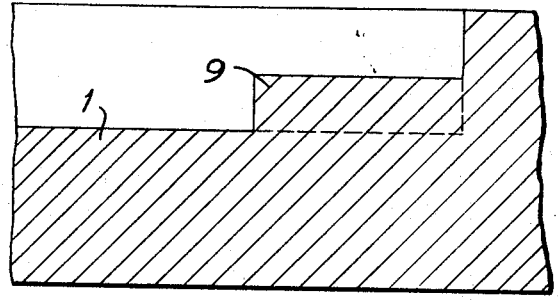
FIG. 2 is a section taken along line 2—2 in FIG. 1.
Figure 3:
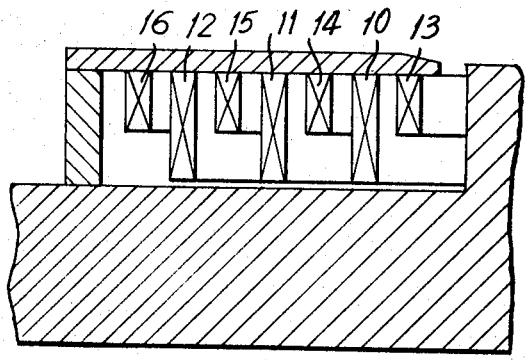
FIG. 3 is a longitudinal sectional view through a conventional rotor with conventional coils.
Figure 4:
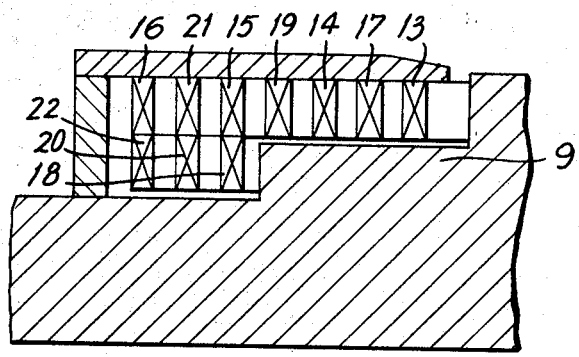
FIG. 4 shows the rotor of FIG. 2 with the coils placed therein.

Referring to FIG. 1 therein can be seen in portion of a rotor core 1 in cross section while FIG. 2 shows a longitudinal section taken along the core. The core has slots 2, 3 and 4 which alternate with and are deeper than slots 5, 6, 7 and 8. The core 1 has an annular cavity as viewed in FIG. 2 with a cylindrical projection 9 which makes it possible to increase the diameter of the rotor core in the most saturated (magnetically) part, at the base of the teeth formed by the slots. The provision of projection 9 dictates a change in the shape of the coils placed in the rotor slots. In fact, in the absence of the projection 9 the front or end portions of the rotor coils would be shaped as shown in FIG. 3, with deep coils 10, 11 and 12 placed in the slots 2, 3 and 4, and shallow coils 13, 14, 15 and 16, in the slots 5, 6, 7 and 8. With the projection 9 provided in accordance with the present invention, the front or end portions of the rotor coils are shaped as shown in FIG. 4, the shallow coils 13, 14, 15, and 16 being placed in slots of smaller depth as in FIG. 3, whereas the coils 10, 11 and 12 are replaced by coils which are divided vertically into two parts: namely coil 10 is divided into outer coil part 17 and inner coil part 18; coil 11 into outer coil part 19 and inner coil part 20, and coil 12 into outer coil part 21 and inner coil part 22, the coil parts 17, 19 and 21 having the same height as the coils 13, 14, 15 and 16.

The front portions of the coils parts 18, 20 and 22 are located under the coils 15, 21 and 16 which are arranged at the greatest distance from the rotor center, reckoned in the axial direction, to provide room for locating the projection 9.

Figure 5:
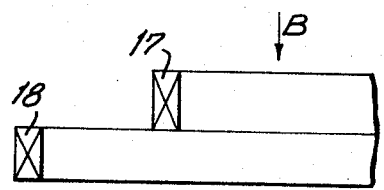
FIG. 5 shows in elevation a coil which is placed in a deep slot of the rotor.
Figure 6:
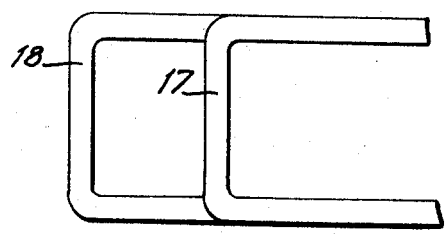
FIG. 6 is a plan view of the coil of FIG. 5.

FIGS. 5 and 6 show the coil 10 divided into coil parts 17 and 18. These coils are divided in their front portions only, the remainder being placed in the slots 2.

The coils 11 and 12 are divided in a similar way.

As a result of the above construction the teeth and the rotor yoke have a greater axial length in the most saturated part, that is, at the root of the teeth, which provides reduction of magnetic induction in the lower portion of the teeth and in the rotor yoke. This feature is particularly effective for rotors with highly saturated lower parts of the teeth, a considerable saving of materials for the rotor windings being ensured due to reduction of the magnetomotive force required for passing the magnetic flux through the rotor.

Finally, a higher output power can be obtained with the same overall dimensions of the machine and vice versa, with the same output power the overall dimensions of the machine can be reduced. Higher rigidity of the rotor can be considered as an additional improvement.

We claim:

1. A rotor for a synchronous non-salient-pole machine comprising a rotor body having a plurality of radial slots arranged in circumferential array around said body and extending axially along said body, and a plurality of coils seated in respective slots, said slots alternately varying in depth to constitute shallow and deep slots, said coils being constituted deep coils located in the deep slots and shallow coils located in the shallow slots, said body including an end portion having an annular cavity into which said slots open, said coils including end portions which extend axially from said slots into said annular cavity, said rotor body including an annular projection extending axially into said annular cavity, the end portions of said shallow coils being staggered in length axially and being at a level surrounding said projection, the end portions of said deep coils including inner and outer coil parts axially offset in length from one another, the outer parts being at the same level as said shallow coils, the inner parts extending axially beyond said projection and below the level of the shallow coils and outer parts.

2. A rotor as claimed in claim 1, wherein each of said shallow coils has an axial length differing from each said outer coil part in said deep slots.

3. A rotor as claimed in claim 2, wherein said shallow coils and outer coil parts have successively greater axial lengths.

4. A rotor as claimed in claim 3, wherein said inner coil parts successively increase in projection from said slots.

5. A rotor as claimed in claim 4, wherein one inner coil part has an axial length equal to the axial length of one shallow coil.

6. A rotor as claimed in claim 5, wherein a second inner coil part has an axial length equal to the axial length of a second shallow coil.

7. A rotor as claimed in claim 6, wherein a third inner coil part has an axial length equal to the axial length of one outer coil part in a different deep slot.

* * * * *